US012659306B2

(12) United States Patent
Dozen et al.

(10) Patent No.: US 12,659,306 B2
(45) Date of Patent: Jun. 16, 2026

(54) COMMUNICATION MEDIATION DEVICE FOR MEDIATING COMMUNICATION WITH CLOUD SERVICE FOR STORING DATA, COMPUTER-READABLE NON-TRANSITORY RECORDING MEDIUM STORING COMMUNICATION MEDIATION PROGRAM, AND IMAGE PROCESSING SYSTEM

(71) Applicant: KYOCERA Document Solutions Inc., Osaka (JP)

(72) Inventors: Kazuki Dozen, Osaka (JP); Tomoharu Tokunaga, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 115 days.

(21) Appl. No.: 18/661,663

(22) Filed: May 12, 2024

(65) Prior Publication Data

US 2025/0240282 A1 Jul. 24, 2025

(51) Int. Cl.
*H04L 9/40* (2022.01)

(52) U.S. Cl.
CPC ................................ *H04L 63/0807* (2013.01)

(58) Field of Classification Search
CPC ................................................... H04L 63/0807
See application file for complete search history.

(56) References Cited

U.S. PATENT DOCUMENTS

| | | | | |
|---|---|---|---|---|
| 2014/0007199 A1* | 1/2014 | Ishino | ................. | H04L 63/0884 726/4 |
| 2014/0096208 A1* | 4/2014 | Buck | ....................... | H04L 41/20 726/5 |
| 2017/0006020 A1* | 1/2017 | Falodiya | ................... | G06F 8/61 |
| 2017/0171201 A1* | 6/2017 | Matsugashita | .......... | H04L 63/20 |
| 2017/0289275 A1* | 10/2017 | Saito | ................... | H04W 12/068 |
| 2018/0152430 A1* | 5/2018 | Takahashi | ............... | H04L 63/08 |
| 2019/0334884 A1* | 10/2019 | Ross | ....................... | G06F 21/41 |
| 2024/0385785 A1* | 11/2024 | Dozen | ................... | G06F 3/1285 |

FOREIGN PATENT DOCUMENTS

JP 2018092564 A 6/2018

* cited by examiner

*Primary Examiner* — Yonas A Bayou
(74) *Attorney, Agent, or Firm* — IP Business Solutions, LLC.

(57) ABSTRACT

The communication mediation device includes an image processing device including a processor and configured to execute image processing when the processor executes a communication mediation program and a controller configured to operate as a communication mediator for mediating communication with a cloud service for storing data.

6 Claims, 12 Drawing Sheets

Fig.1

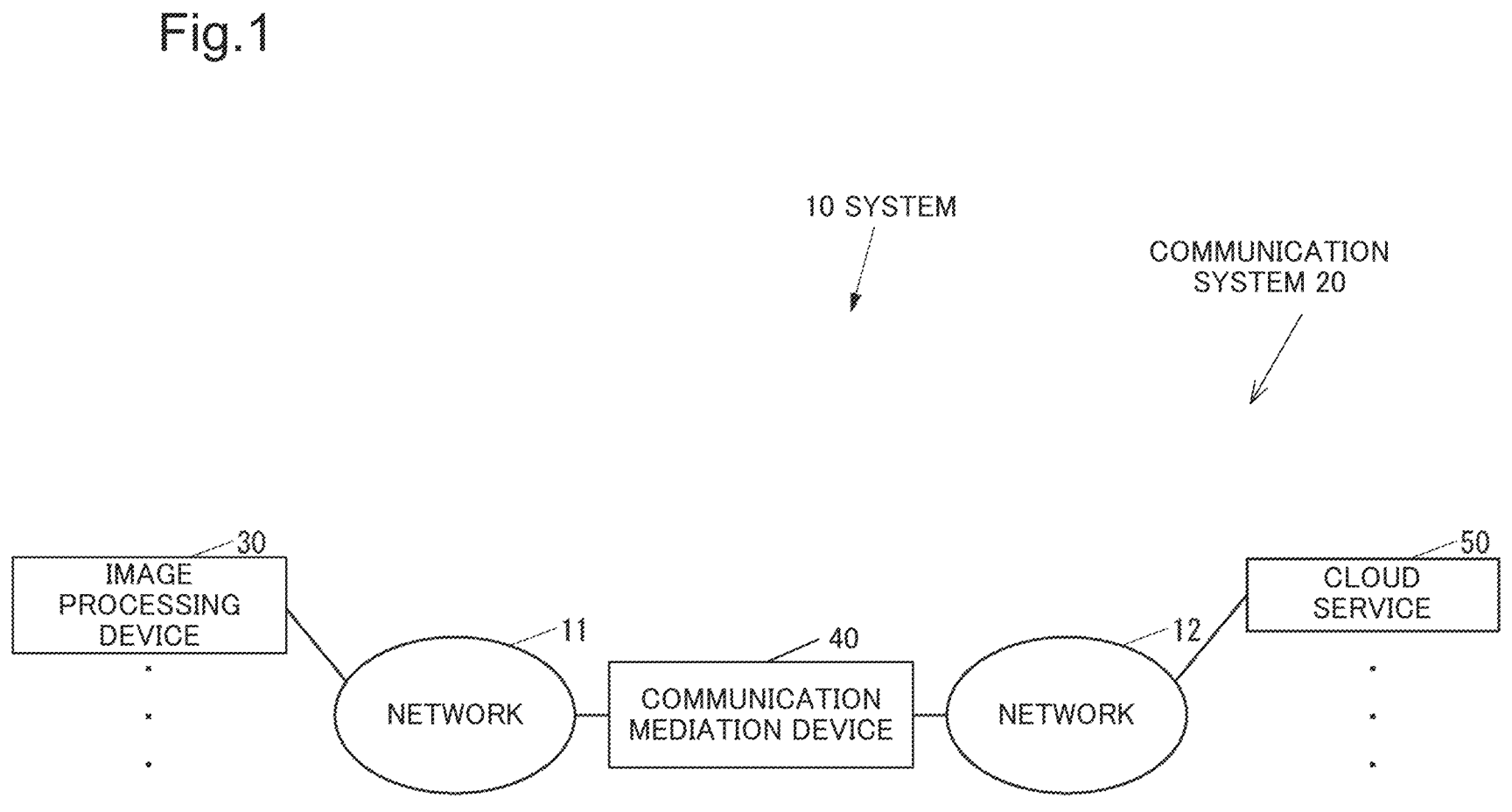

COMMUNICATION
SYSTEM 20

10 SYSTEM

CLOUD
SERVICE

50

12

NETWORK

COMMUNICATION
MEDIATION DEVICE

40

11

NETWORK

IMAGE
PROCESSING
DEVICE

30

30 IMAGE PROCESSING DEVICE

31 OPERATION DEVICE

32 DISPLAY DEVICE

33 PRINTER

34 SCANNER

35 COMMUNICATION DEVICE

36 STORAGE DEVICE

36a CLOUD SERVICE USAGE PROGRAM

37 CONTROLLER

37a CLOUD SERVICE USAGE DEVICE

Fig.4

44b USER MANAGEMENT INFORMATION

| USER ID | INITIAL PASSWORD | NON-INITIAL PASSWORD | PIN CODE |
|---------|------------------|----------------------|----------|
| · · · | · · · | · · · | · · · |
| USER001 | abcd0123 | zp3m4A6c | 12854369 |
| · · · | · · · | · · · | · · · |

Fig.5

44c ACCESS TOKEN MANAGEMENT INFORMATION

| ACCESS TOKEN | USER ID | CLOUD SERVICE |
|---|---|---|
| . | . | . |
| . | . | . |
| . | . | . |
| | USER001 | XXXX Drive |
| . | . | . |
| . | . | . |
| . | . | . |

COMMUNICATION MEDIATION DEVICE FOR MEDIATING COMMUNICATION WITH CLOUD SERVICE FOR STORING DATA, COMPUTER-READABLE NON-TRANSITORY RECORDING MEDIUM STORING COMMUNICATION MEDIATION PROGRAM, AND IMAGE PROCESSING SYSTEM

INCORPORATION BY REFERENCE

This application claims priority to Japanese Patent Application No. 2023-081081 filed on May 16, 2023, the entire contents of which are incorporated by reference herein.

BACKGROUND

An image processing device for executing communication with a cloud service is known.

SUMMARY

The present disclosure relates to a communication mediation device for mediating communication with an image processing device for executing image processing and a cloud service for storing data, a communication mediation program, and an image processing system.

As an aspect of the present disclosure, technology obtained by further improving the above-described technology is proposed.

According to an aspect of the present disclosure, a communication mediation device includes a controller that includes a processor and functions, through the processor executing a communication mediation program, as a communication mediator that mediates communication between an image processing device for executing image processing and a cloud service for storing data.

According to an aspect of the present disclosure, a computer-readable non-transitory recording medium stores a communication mediation program. The communication mediation program causes a computer provided in a communication mediation device to operate as a communication mediator for mediating communication between an image processing device and a cloud service.

According to an aspect of the present disclosure, an image processing system includes an image processing device configured to execute image processing; and a communication mediation device configured to mediate communication between the image processing device and a cloud service for storing data.

BRIEF DESCRIPTION OF THE DRAWINGS

FIG. 1 is a block diagram of a communication mediation system according to an embodiment of the present disclosure.

FIG. 4 is a diagram showing an example of user management information shown in FIG. 3.

FIG. 5 is a diagram showing an example of access token management information shown in FIG. 3.

DETAILED DESCRIPTION

Figure 2:
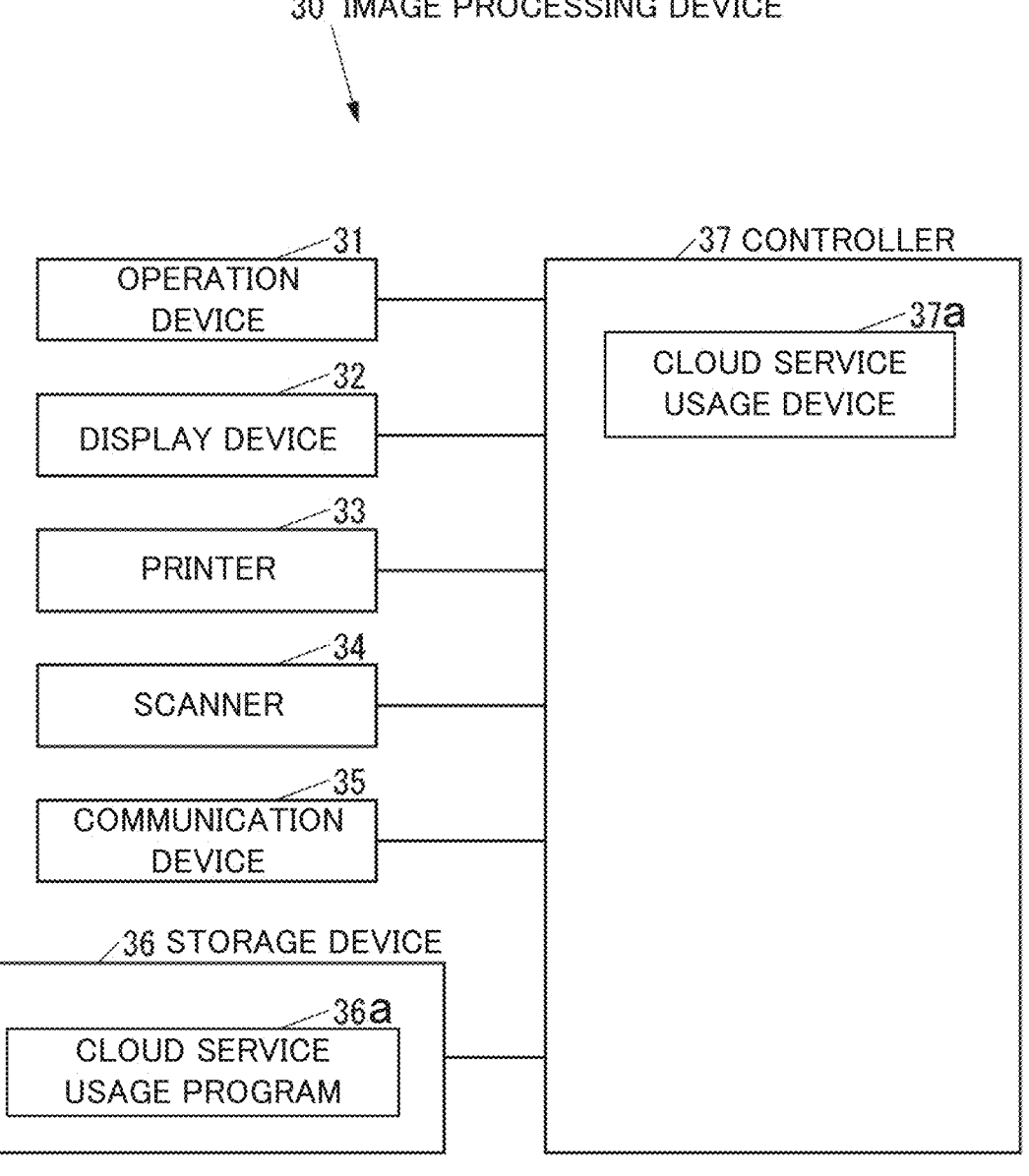
FIG. 2 is a block diagram of an image processing device when the image processing device shown in FIG. 1 is an MFP.

Hereinafter, a communication mediation device, a communication mediation system, a communication mediation program, and an image processing system according to embodiments will be described as aspects of the present disclosure with reference to the drawings.

First, a configuration of the communication mediation system according to the embodiment of the present disclosure will be described.

FIG. 1 is a block diagram of a communication mediation system 10 according to the present embodiment. Hereinafter, the communication mediation system 10 is simply referred to as the system 10.

As shown in FIG. 1, the system 10 includes an image processing device 30 configured to execute image processing in cooperation with a cloud service (cloud storage) 50 for storing data.

The system 10 may include a plurality of image processing devices 30. In the present embodiment, an example in which the system 10 includes one image processing device 30 will be described. The image processing device 30 is, for example, embedded equipment such as a multifunction peripheral (MFP), a printer-specific machine, or a scanner-specific machine. In the image processing device 30, an update process such as the replacement of the image processing device 30 with an image processing device of a touch panel or a change in an executable process is not facilitated due to the nature of the embedded equipment.

In addition to the image processing device 30, the system 10 includes a communication mediation device 40 configured to mediate communication with the cloud service 50. The communication mediation device 40 may include one computer such as a personal computer (PC) or may include a plurality of computers.

The communication mediation device 40 communicates with the cloud service 50 for storing data. The communication mediation device 40 can communicate with a plurality of cloud services 50. As the cloud service for storing data, for example, "Google Drive" of "Google LLC," "Microsoft SharePoint (registered trademark) Online" of "Microsoft Corporation," "Microsoft OneDrive (registered trademark)" of "Microsoft Corporation," and "Evernote (registered trademark)" of "Evernote Corporation," and the like are employed. As prescribed in Section 8.12 of RFC 8252 of OAuth 2.0, there are many cloud services that restrict access from embedded equipment such as an MFP in the latest security defaults.

In addition, an image processing system 20 includes one or more image processing devices 30, one or more communication mediation devices 40, and one or more cloud services 50.

The image processing device 30 and the communication mediation device 40, for example, can communicate with each other via a network 11 such as a local area network (LAN) or the Internet. The communication mediation device 40 and the cloud service 50 can communicate with each other via a network 12 such as the Internet.

FIG. 2 is a block diagram of a case in which the image processing device 30 is an MFP.

As shown in FIG. 2, the image processing device 30 includes an operation device 31 including operation devices such as, for example, buttons to which various operations are input, a display device 32 that is a display device such as, for example, a liquid crystal display (LCD) that displays various information, a printer 33 that is a printing device that prints an image on a recording medium such as paper, a scanner 34 that is a reading device that reads an image from a manuscript, a communication device that is a communication device including, for example, a communication interface or the like that communicates with an external device via a network such as a LAN or the Internet or directly by wire or wirelessly without going through any network, a storage device 36 that is a nonvolatile storage device for storing various types of information such as a semiconductor memory or a hard disk drive (HDD), and a controller 37 that controls the entire image processing device 30.

The storage device 36 stores a cloud service usage program 36a for using the cloud service. The cloud service usage program 36a, for example, may be installed on the image processing device 30 at a manufacturing stage of the image processing device 30, may be additionally installed on the image processing device 30 from an external storage medium such as a Universal Serial Bus (USB) memory, or may be additionally installed on the image processing device 30 from the network.

The controller 37 includes, for example, a central processing unit (CPU), a read-only memory (ROM) storing programs and various types of data, and a random-access memory (RAM) serving as a memory used as a work area of the CPU of the controller 37. The CPU of the controller 37 executes a program stored in the ROM of the storage device 36 or the controller 37.

The controller 37 operates as a cloud service usage device 37a using the cloud service by executing the cloud service usage program 36a.

Figure 3:
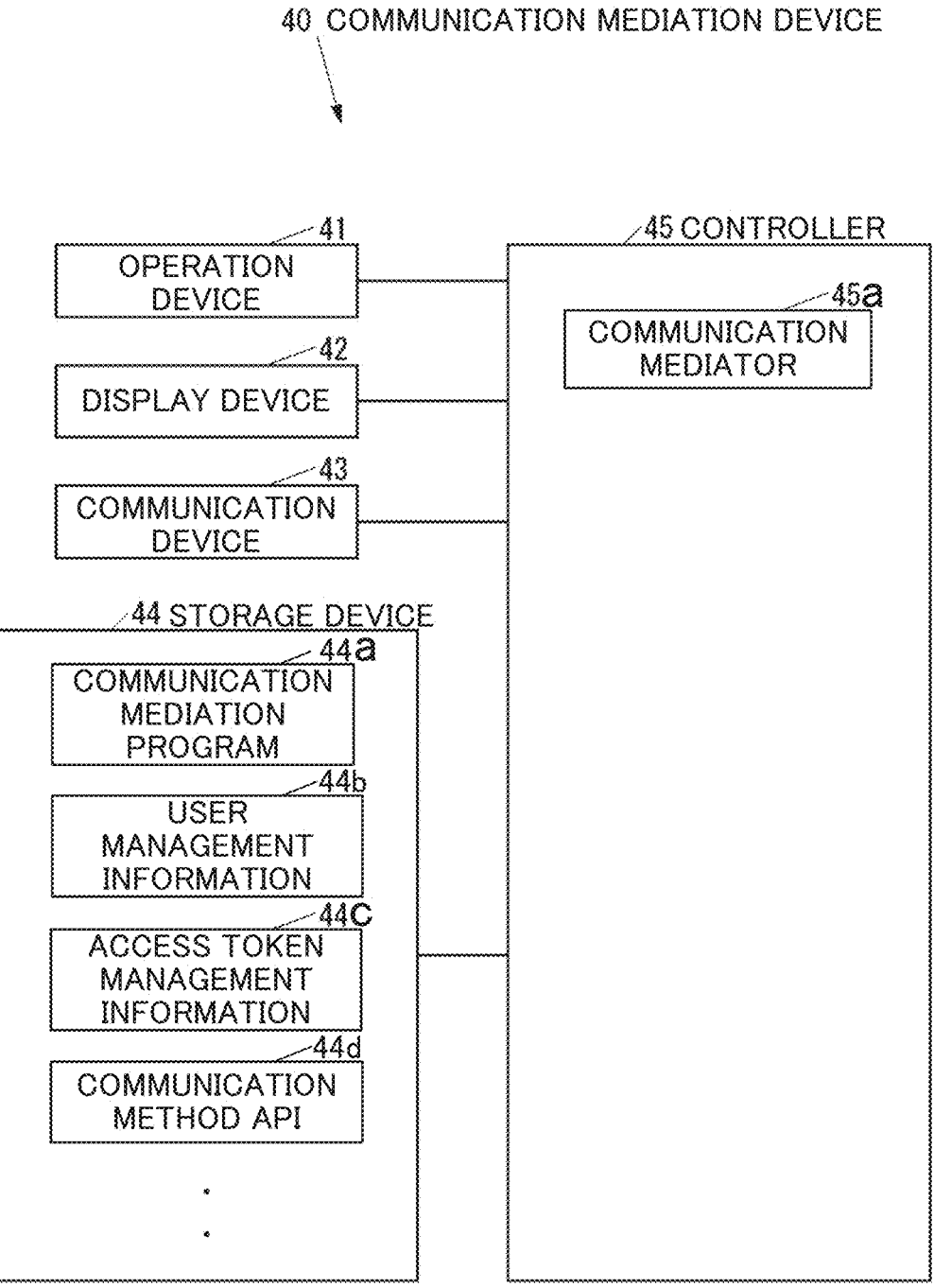
FIG. 3 is a block diagram of a case in which the communication mediation system shown in FIG. 1 includes one computer.

FIG. 3 is a block diagram of the communication mediation device 40 when the communication mediation device 40 includes one computer.

As shown in FIG. 3, the communication mediation device 40 includes an operation device 41 including operation devices such as, for example, a keyboard, and a mouse to which various operations are input, a display device 42 that is a display device such as, for example, an LCD that displays various information, a communication device 43 that is a communication device including, for example, a communication interface or the like that communicates with an external device via a network such as a LAN or the Internet or directly by wire or wirelessly without going through any network, a storage device 44 that is a nonvolatile storage device for storing various types of information such as, for example, a semiconductor memory or an HDD, and a controller 45 that controls the operation of the entire communication mediation device 40. The controller is an example of a computer in the claims.

The storage device 44 stores a communication mediation program 44a for mediating communication between the image processing device and the cloud service. The communication mediation program 44a, for example, may be installed on the communication mediation device 40 at the manufacturing stage of the communication mediation device 40, may be additionally installed on the communication mediation device 40 from an external storage medium such as a USB memory, or may be additionally installed on the communication mediation device 40 from the network. The communication mediation program 44a may be a resident utility application program. The communication mediation program 44a is stored in a computer-readable non-transitory recording medium, such as a compact disc (CD), a USB memory, or the storage device 44.

The storage device 44 stores user management information 44b for managing users.

FIG. 4 is a diagram showing an example of the user management information 44b.

As shown in FIG. 4, in the user management information 44b, a user ID that is user identification information indicating a user who is authorized to receive a communication mediation process based on an operation of a communication mediator 45a corresponding to the communication mediation program 44a (hereinafter referred to as a user for the communication mediation program 44a), an initial password of the user for the communication mediation program 44a, a password other than the initial password of the user for the communication mediation program 44a (hereinafter referred to as a "non-initial password"), and a personal identification number (PIN) code of the user for the communication mediation program 44a are associated with each user.

As shown in FIG. 3, the storage device 44 stores access token management information 44c that is information for managing an access token serving as cloud service login information for logging into the cloud service from the communication mediation device 40.

FIG. 5 is a diagram showing an example of the access token management information 44c.

As shown in FIG. 5, in the access token management information 44c, a user ID and a cloud service are associated with each access token. In FIG. 5, a specific example of the access token is omitted.

Moreover, as shown in FIG. 3, the storage device 44 stores a communication method application program interface (API) 44d that is an API of a communication method for a cloud service. The storage device 44 stores one or more communication method APIs 44d. The storage device 44 stores a communication method API for each cloud service.

The controller 45 includes, for example, a CPU, a ROM storing programs and various types of data, and a RAM serving as a volatile storage device used as a working area of the CPU of the controller 45. The CPU of the controller 45 executes a program stored in the storage device 44 or the ROM of the controller 45.

The controller 45 operates as the communication mediator 45a that performs a communication mediation process of mediating communication between the image processing device and the cloud service by executing the communication mediation program 44a.

Next, an operation of the system 10 will be described. Hereinafter, the image processing device 30 will be described as a representative image processing device.

First, an operation of the communication mediation device 40 when an access token for logging into the cloud service is registered in the access token management information 44c will be described.

Figure 6:
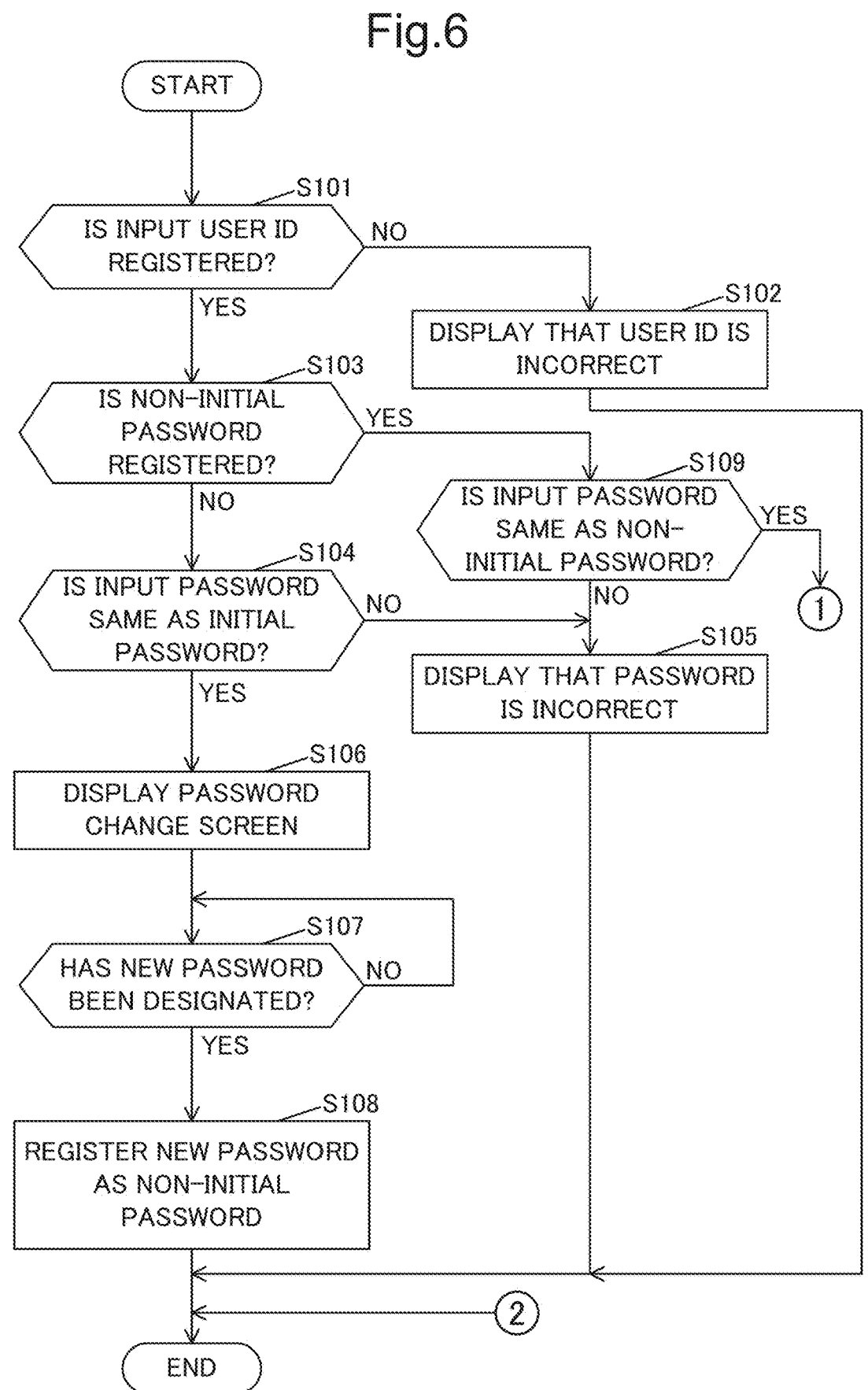
FIG. 6 is a flowchart of a part of an operation of the communication mediation system shown in FIG. 3 when an access token for logging into a cloud service is registered in the access token management information.
Figure 7:
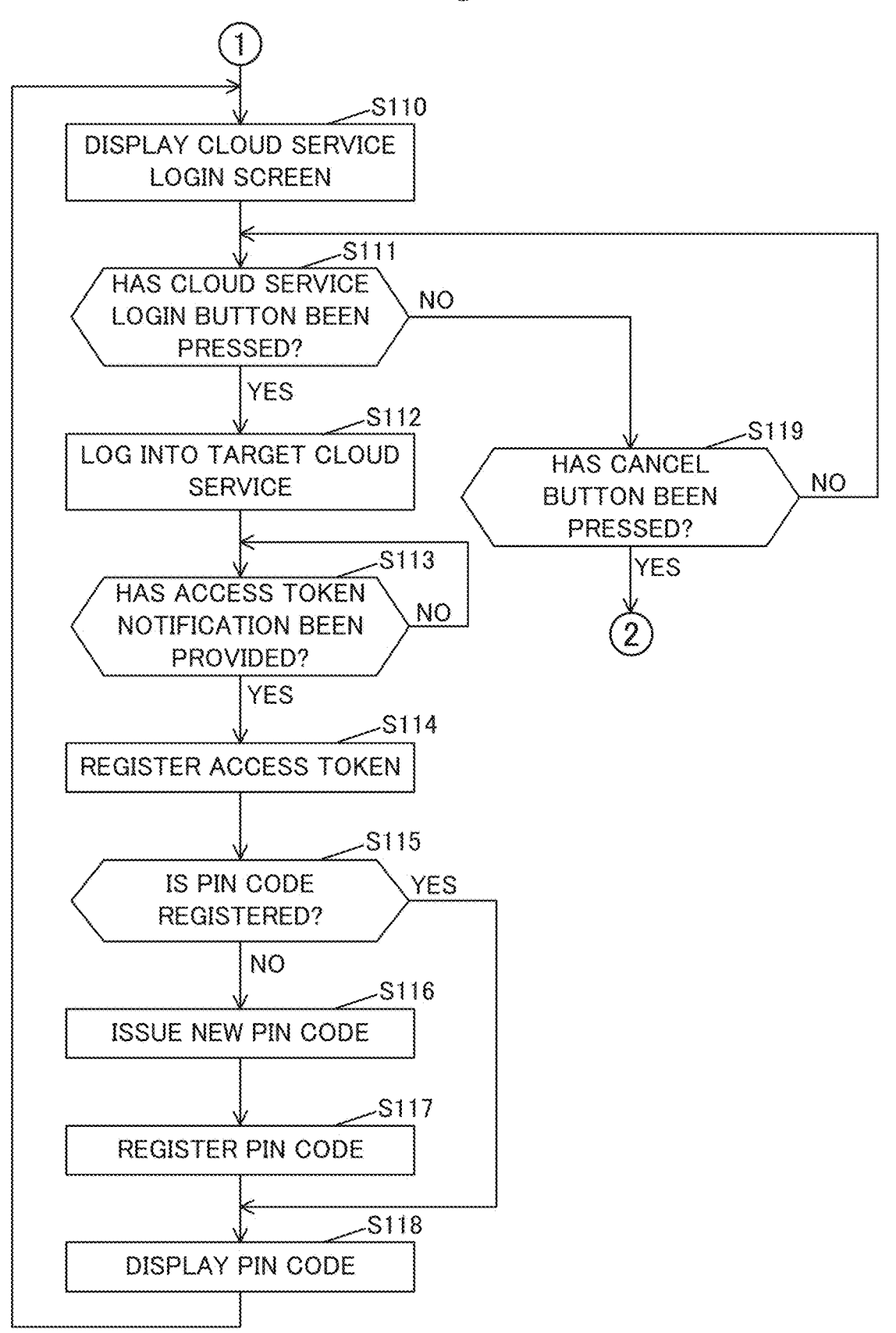
FIG. 7 is a flowchart of an operation subsequent to the operation shown in FIG. 6.

FIG. 6 is a flowchart of a part of the operation of the communication mediation device 40 when the access token for logging into the cloud service is registered in the access token management information 44c. FIG. 7 is a flowchart of an operation subsequent to the operation shown in FIG. 6.

The user is notified in advance of a user ID for the communication mediation program 44a and an initial password for the communication mediation program 44a. The user inputs the user ID for the communication mediation program 44a and the initial password for the communication mediation program 44a from the operation device 41 of the communication mediation device 40.

When a user ID and password are input (hereinafter, the "user ID that has been input" and the "password that has been input" are referred to as an "input user ID" and an "input password," respectively), the communication mediator 45a of the communication mediation device 40 determines whether or not the input user ID is registered in the user management information 44b (S101).

When it is determined that the input user ID is not registered in the user management information 44b in S101, the communication mediator 45a displays that the user ID is incorrect on the display device 42 (S102). Thereafter, the process shown in FIGS. 6 and 7 ends.

When it is determined that the input user ID is registered in the user management information 44b in S101, the communication mediator 45a determines whether or not a non-initial password associated with the input user ID is registered in the user management information 44b (S103).

When it is determined that the non-initial password associated with the input user ID is not registered in the user management information 44b (NO in S103), the communication mediator 45a determines whether or not the input password is the same as the initial password associated with the input user ID in the user management information 44b (S104).

When it is determined that the input password is different from the initial password associated with the input user ID in the user management information 44b (NO in S104), the communication mediator 45a displays that the password is incorrect on the display device 42 (S105). Thereafter, the process shown in FIGS. 6 and 7 ends.

On the other hand, when it is determined that the input password is the same as the initial password associated with the input user ID in the user management information 44b, i.e., the user's login to the communication mediator 45a has succeeded (YES in S104), the communication mediator 45a displays a screen for changing a password (hereinafter referred to as a "password change screen") on the display device 42 (S106).

After the processing of S106, the communication mediator 45a determines whether or not a new password has been designated via the operation device 41 on the password change screen (S107).

When it is determined that a new password has been designated on the password change screen in S107, the communication mediator 45a registers the designated new password in the user management information 44b as a non-initial password associated with the input user ID (S108). Thereafter, the process shown in FIGS. 6 and 7 ends.

Moreover, when it is determined that the non-initial password associated with the input user ID is registered in the user management information 44b in S103 (YES in S103), the communication mediator 45a determines whether or not the input password is the same as the non-initial password associated with the input user ID in the user management information 44b (S109).

Here, when it is determined that the input password is different from the non-initial password associated with the input user ID in the user management information 44b in S109 (NO in S109), the communication mediator 45a displays that the password is incorrect on the display device 42 (S105). Thereafter, the process shown in FIGS. 6 and 7 ends.

On the other hand, when the communication mediator 45a determines that the input password is the same as the non-initial password associated with the input user ID in the user management information 44b, i.e., the user has successfully logged into the communication mediator 45a, in S109 (YES in S109), the communication mediator 45a displays a screen for logging into the cloud service (hereinafter referred to as a "cloud service login screen") on the display device 42 (S110). That is, the user can perform a process of logging into the cloud service from the image processing device 30 by inputting the user ID for the communication mediation program 44a and the non-initial password for the communication mediation program 44a from the operation device 41 of the communication mediation device 40.

Figure 8:
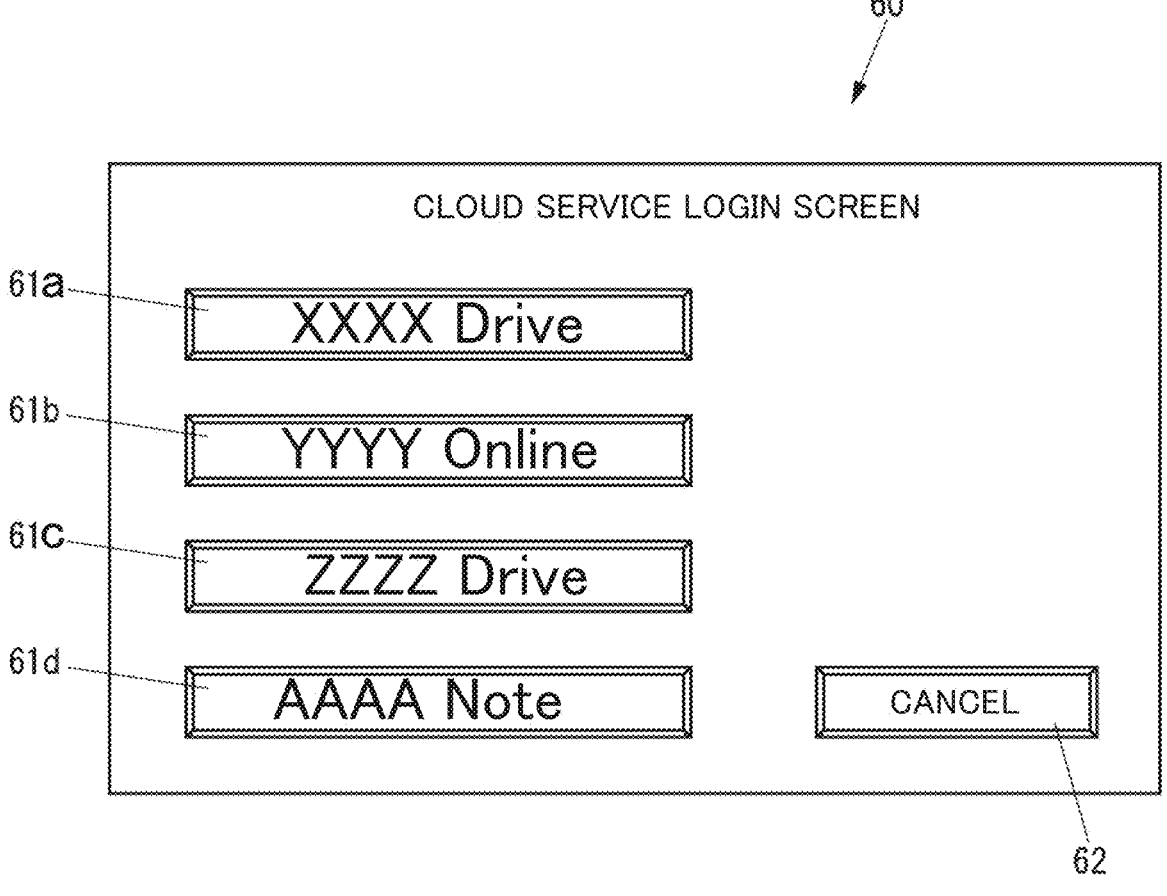
FIG. 8 is a diagram showing an example of a cloud service login screen displayed on a display device shown in FIG. 3.

FIG. 8 is a diagram showing an example of a cloud service login screen 60 displayed on the display device 42.

As shown in FIG. 8, the cloud service login screen 60 includes buttons for logging into cloud services (hereinafter referred to as "cloud service login buttons") 61a to 61d for each cloud service. The cloud service login screen 60 includes a cancel button 62 for canceling the login to the cloud service.

After the display of the cloud service login screen 60 in S110, the communication mediator 45a determines whether or not the cloud service login button has been operated via the operation device 41 (S111).

When the communication mediator 45a determines that the cloud service login button has been operated in S111 (YES in S111), a login process of the user for a cloud service associated with the pressed cloud service login button (hereinafter referred to as a "target cloud service") is executed (S112). Specifically, the communication mediator 45a allows the user to input the user ID and password for the target cloud service from the operation device 41 of the communication mediation device 40 and executes authentication as a login process for logging into the target cloud service using the user ID and password input by the user. When the user's login has been authenticated, the target cloud service transmits an access token for logging into the target cloud service from the communication mediator 45a to the communication mediation device 40 to provide a notification thereof.

After the processing of S112, the communication mediator 45a of the communication mediation device 40 determines whether or not the notification of the access token has been provided from the target cloud service until it is determined that the notification of the access token has been provided from the target cloud service (NO in S113).

When the communication mediator 45a determines that the notification of the access token has been provided from the target cloud service in S113 (YES in S113), the access token whose notification has been provided from the target cloud service is registered as the access token management information 44c in association with the input user ID and the target cloud service (S114).

When the processing of S114 ends, the communication mediator 45a determines whether or not the PIN code associated with the input user ID is registered in the user management information 44b (S115).

When the communication mediator 45a determines that the PIN code associated with the input user ID is not registered in the user management information 44b (NO in S115), a new PIN code that is not registered in the user management information 44b is issued (S116).

When the processing of S116 ends, the communication mediator 45a registers the PIN code issued in S116 in association with the input user ID in the user management information 44b (S117).

When the communication mediator 45a determines that the PIN code associated with the input user ID is registered in the user management information 44b in S115 or when the processing of S117 ends, the PIN code associated with the input user ID and registered in the user management information 44b is displayed on the display device 42 (S118). After S118, the process returns to S110.

In addition, when the communication mediator 45a determines that the cloud service login button has not been pressed in S111 (NO in S111), it is determined whether or not the cancel button 62 has been pressed via the operation device 41 (S119).

When the communication mediator 45a determines that the cancel button 62 has not been pressed (NO in S119), the processing of S111 is subsequently performed.

When the communication mediator 45a determines that the cancel button 62 has been pressed in S119 (YES in S119), the process shown in FIGS. 6 and 7 ends.

Next, an operation of the system 10 when a process of logging into the cloud service from the image processing device 30 is performed will be described.

Figure 9:
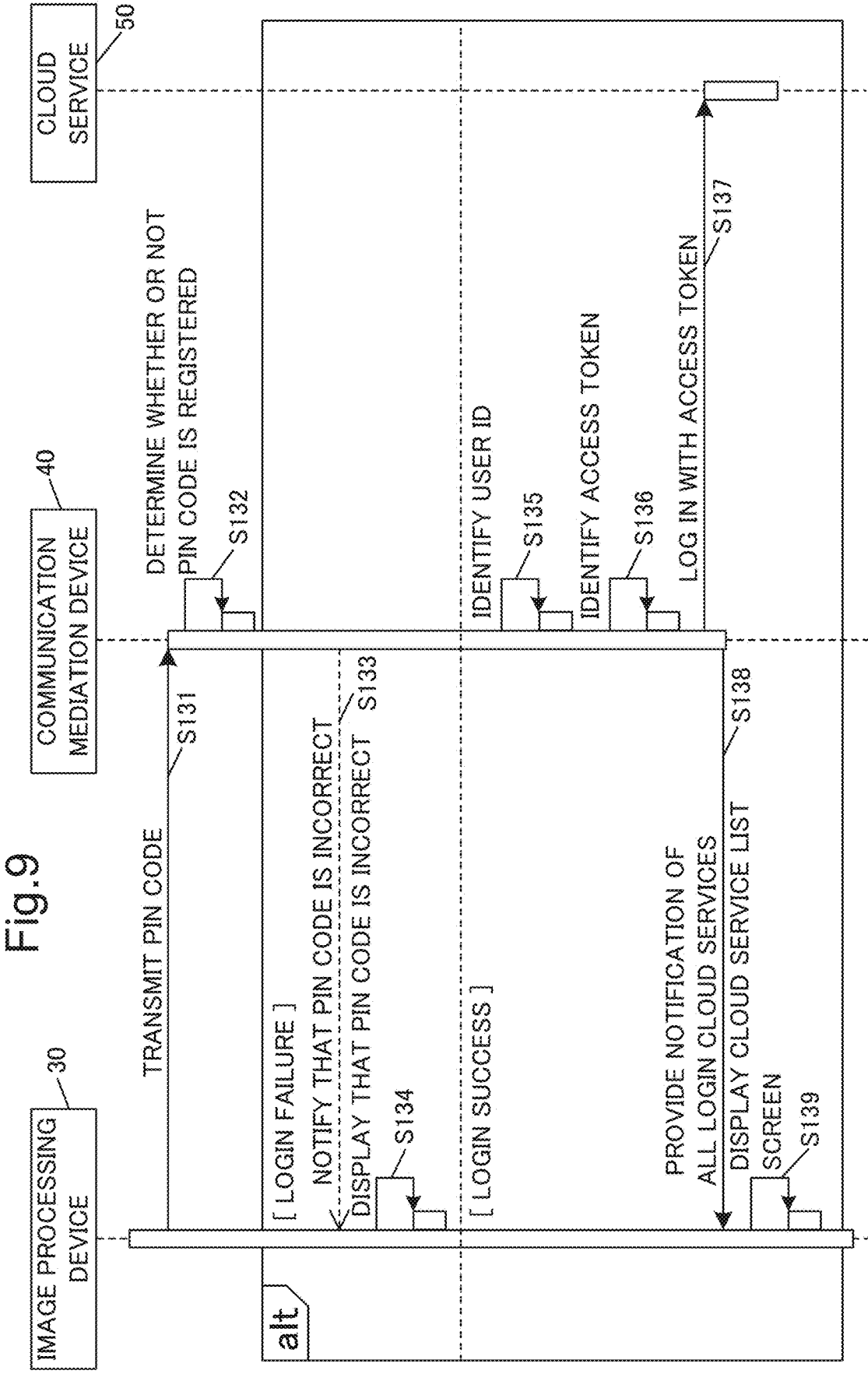
FIG. 9 is a sequence diagram of an operation of the system shown in FIG. 1 in the case of logging into a cloud service from an image processing device.

FIG. 9 is a sequence diagram of the operation of the system 10 when the process of logging into the cloud service from the image processing device 30 is performed. The user inputs the PIN code displayed in S118 from the operation device 31 of the image processing device 30.

When the PIN code is input, the cloud service usage device 37a of the image processing device 30 transmits the input PIN code from the communication device 35 to the communication mediation device 40 (S131).

When the PIN code transmitted in S131 is received by the communication device 43, the communication mediator 45a of the communication mediation device 40 determines whether or not the received PIN code is registered in the user management information 44b (S132).

When the communication mediator 45a determines that the received PIN code is not registered in the user management information 44b in S132, i.e., when the user's login to the communication mediator 45a has failed, the image processing device 30 is notified that the PIN code is incorrect (S133).

When the cloud service usage device 37a of the image processing device 30 receives the notification in S133 via the communication device 35, the display device 42 displays that the PIN code is incorrect (S134). Thereafter, the process shown in FIG. 9 ends.

On the other hand, when the communication mediator 45a determines that the received PIN code is registered in the user management information 44b, i.e., the user has successfully logged into the communication mediator 45a, in S132, the user ID associated with the received PIN code in the user management information 44b is identified (S135).

When the processing of S135 ends, the communication mediator 45a identifies a cloud service and an access token associated with the user ID identified in S135 in the access token management information 44c (S136).

The communication mediator 45a logs into the cloud service identified in S136 via the communication device 43 using the access token identified in S136 (S137). Although an example in which the communication mediator 45a logs into one cloud service 50 in S137 is shown, the communication mediator 45a logs into all identified cloud services when a plurality of cloud services and a plurality of access tokens associated with the user ID identified in S135 are identified in S136.

When the processing of S137 ends, the communication mediator 45a provides a notification of all the cloud services logged in in S137 from the communication device 43 to the image processing device 30 (S138).

When the cloud service usage device 37a of the image processing device 30 receives a notification in S138 via the communication device 35, a screen indicating all the cloud services indicated in the notification (hereinafter referred to as a "cloud service list screen") is displayed on the display device 32 (S139). In a cloud service list screen 70 (to be described later), all cloud services authenticated for a user using the image processing device 30 are indicated.

Figure 10:
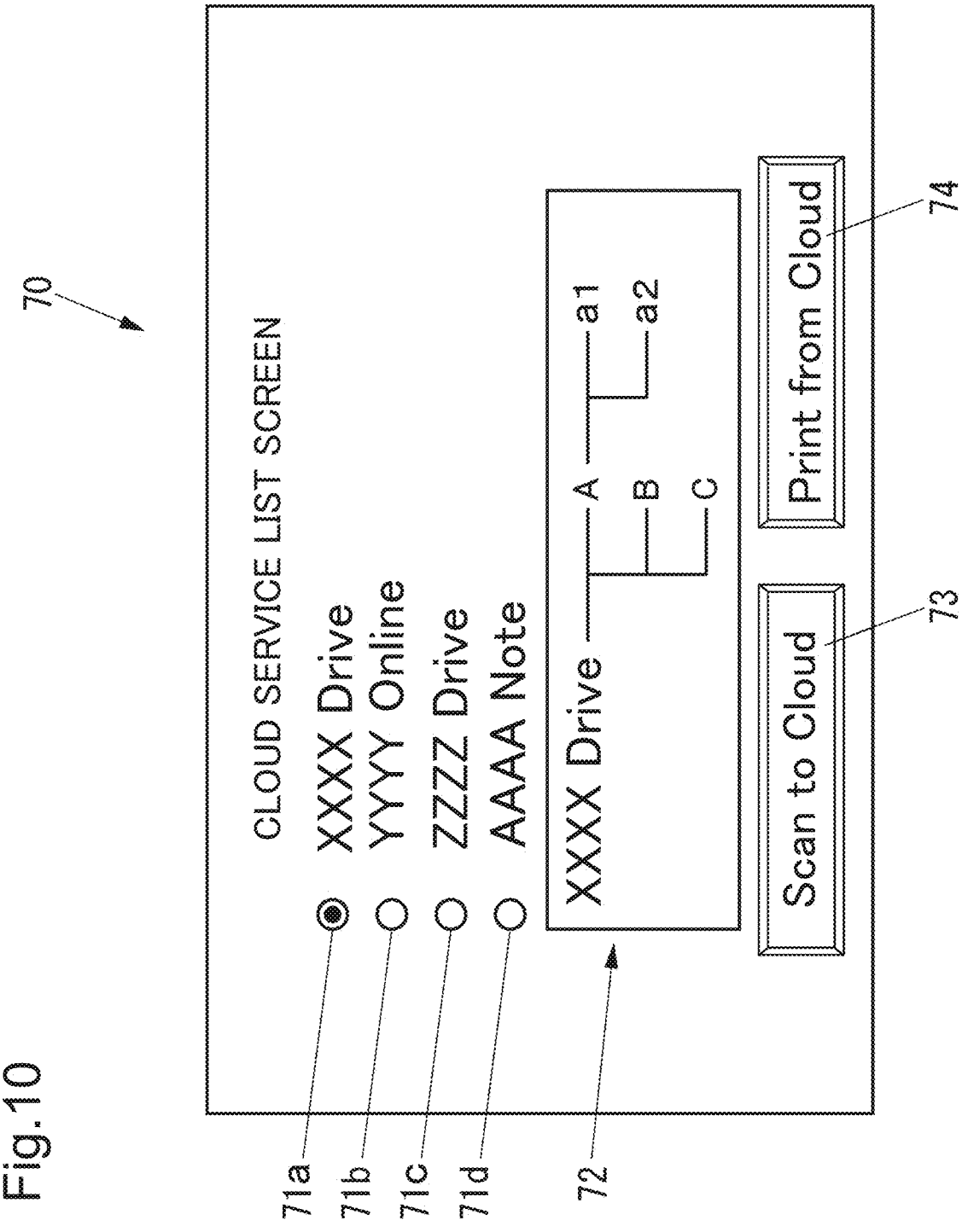
FIG. 10 is a diagram showing an example of a cloud service list screen displayed on the display device shown in FIG. 2.

FIG. 10 is a diagram showing an example of the cloud service list screen 70 displayed on the display device 32.

As shown in FIG. 10, the cloud service list screen 70 includes radio buttons 71a to 71d for selecting a cloud service, a processing target selector 72 for selecting a folder or file of the cloud service selected with the radio buttons 71a to 71d, a "Scan to Cloud" button 73 for uploading scan data to a folder selected with the processing target selector 72, and a "Print from Cloud" button 74 for receiving an instruction for downloading and printing a file selected with the processing target selector 72. In the processing target selector 72, a folder or file of the cloud service selected with the radio buttons 71a to 71d is displayed. The cloud service usage device 37a receives an instruction corresponding to an operation on the "Scan to Cloud" button 73 only when a folder is selected with the processing target selector 72. The cloud service usage device 37a receives an instruction corresponding to an operation on the "Print from Cloud" button 74 only when a file is selected with the processing target selector 72.

Next, an operation of the system 10 when the scan data generated by the image processing device 30 is uploaded to the cloud service will be described.

Figure 11:
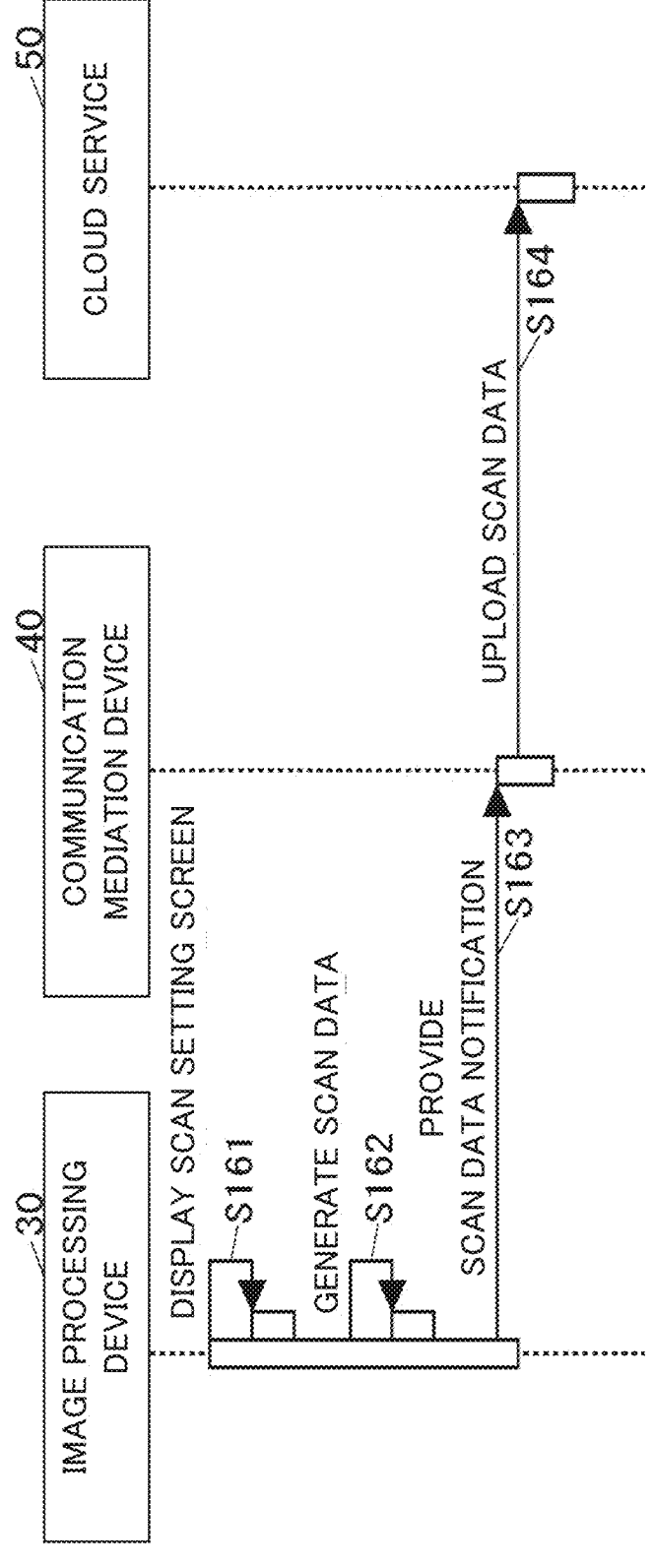
FIG. 11 is a sequence diagram of an operation of the system shown in FIG. 1 when scan data generated by the image processing device is uploaded to the cloud service.

FIG. 11 is a sequence diagram of the operation of the system 10 when the scan data generated by the image processing device 30 is uploaded to the cloud service.

When the cloud service list screen 70 is displayed on the display device 32 of the image processing device 30, the user selects the cloud service according to an operation on the radio buttons 71a to 71d, selects a folder according to an operation on the processing target selector 72, sets a manuscript on the scanner 34, and operates the "Scan to Cloud" button 73. Each instruction corresponding to an operation on each of these buttons is received by the operation device 31 via the touch panel provided in the display device 32.

When a transmission instruction is received by the operation device 31 according to an operation on the "Scan to Cloud" button 73, the cloud service usage device 37a of the image processing device 30 displays a scan setting screen for setting the scan on the display device 32 (S161).

By operating each operation button displayed on the scan setting screen by the user, the designation of scan setting content and a scan execution instruction are received by the operation device 31 via the touch panel.

When the scan execution instruction is received by the operation device 31, the cloud service usage device 37a of the image processing device 30 reads an image from the manuscript with the scanner 34 in the setting content received when the scan setting screen is displayed and generates scan data including the image read from the manuscript (S162).

Subsequently, the cloud service usage device 37a transmits the scan data generated in S162 to the communication mediation device 40 via the communication device 35 (S163). At a point in time when the above-described transmission instruction has been received by the operation device 31, the cloud service usage device 37a transmits a cloud service whose selection has been received on the basis of an operation on the radio buttons 71a to 71d on the cloud service list screen 70 and a path of a folder received on the basis of an operation on the processing target selector 72 (information for identifying the folder) to the communication mediation device 40 together with the scan data.

The cloud service usage device 37a uses, for example, an interface called "SendData (ScanData, Destination Cloud, Cloud Directory)" as a communication method in S163. In this interface, "SendData" is a name of a unified interface that does not depend on a cloud service. In this interface, the argument in parentheses is a variable part. The scan data generated in S162 is input to "ScanData" in the argument. A cloud service received at a point in time when an instruction based on the operation on the "Scan to Cloud" button 73 of the cloud service list screen 70 has been received by the operation device 31 is input to "Destination Cloud" in the argument. The path of the folder received at a point in time when an instruction based on the operation on the "Scan to Cloud" button 73 of the cloud service list screen 70 has been received by the operation device 31 is input to "Cloud Directory" in the argument.

When the communication mediator 45a of the communication mediation device receives the data transmission in S163 via the communication device 43, the received scan data is uploaded to the folder indicated by the above-described path included in the data transmission in the cloud service received together with the received scan data according to a communication method independently prescribed by the vendor of the cloud service, i.e., using a communication method API corresponding to the cloud service included in the data transmission (S164). For example, when the interface called "SendData (ScanData, Destination Cloud, Cloud Directory)" is used as the communication method in S163, the communication mediator 45a of the communication mediation device 40 uploads scan data designated in "ScanData" to the folder designated in "Cloud Directory" of the cloud service designated in "Destination Cloud" using the communication method API for the cloud service designated in "Destination Cloud."

Next, an operation of the system 10 when a file downloaded from the cloud service is printed by the image processing device 30 will be described.

Figure 12:
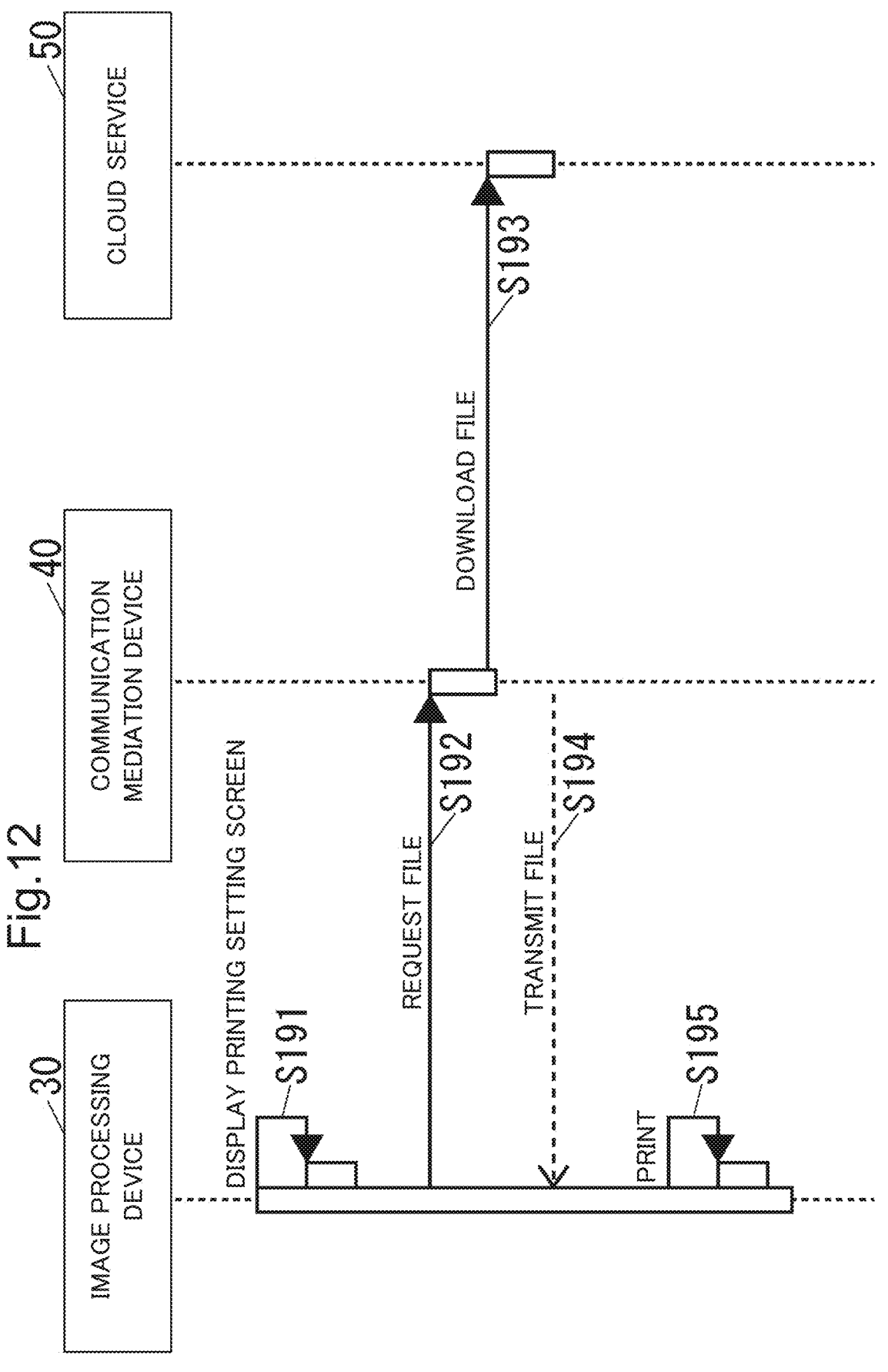
FIG. 12 is a sequence diagram of an operation of the system shown in FIG. 1 when a file downloaded from the cloud service is printed by the image processing device.

FIG. 12 is a sequence diagram of the operation of the system 10 when the file downloaded from the cloud service is printed by the image processing device 30.

When the cloud service list screen 70 is displayed on the display device 32 of the image processing device 30, the user selects a cloud service according to an operation on the radio buttons 71a to 71d, selects a file according to an operation on the processing target selector 72, and operates the "Print from Cloud" button 74. Each instruction corresponding to the operation on each of these buttons is received by the operation device 31 via the touch panel provided in the display device 32.

When a printing instruction is received by the operation device 31 on the basis of the operation on the "Print from Cloud" button 74, the cloud service usage device 37a of the image processing device 30 displays a printing setting screen for printing settings on the display device 32 (S191).

According to the operation on each operation button displayed on the print setting screen by the user, the designation of printing setting content and the printing execution instruction are received by the operation device 31 via the touch panel.

When the printing execution instruction has been received by the operation device 31, the cloud service usage device 37a of the image processing device 30 transmits a transmission request for the file selected according to the operation on the processing target selector 72 of the cloud service list screen 70 from the communication device 35 to the communication mediation device 40 at a point in time when the printing execution instruction has been received (S192). At the point in time when the above-described printing execution instruction has been received, the cloud service usage device 37a transmits a cloud service whose selection has been received on the basis of an operation on the radio buttons 71a to 71d on the cloud service list screen 70 and a path of a file whose selection has been received on the basis of the operation on the processing target selector 72 on the cloud service list screen 70 from the communication device 35 to the communication mediation device 40 together with the above-described transmission request.

The cloud service usage device 37a uses, for example, an interface called "GetData (Destination Cloud, Cloud File)," as the communication method in S192. In this interface, "GetData" is a name of a unified interface that does not depend on the cloud service. In this interface, the argument in parentheses is a variable part. At a point in time when the printing instruction has been received by the operation device 31 on the basis of the operation on the "Print from Cloud" button 74 on the cloud service list screen 70, a cloud service whose selection has been received by the operation device 31 is input to "Destination Cloud" in the argument. At a point in time when the printing instruction has been received by the operation device 31 on the basis of the operation on the "Print from Cloud" button 74 of the cloud service list screen 70, a path of a file whose selection has been received by the operation device 31 is input to "Cloud File" in the argument.

When the communication mediator 45a of the communication mediation device receives the transmission request in S192 via the communication device 43, the file indicated by the path received together with the transmission request in the cloud service received together with the transmission request is downloaded from the cloud service according to a communication method independently prescribed by the vendor of the cloud service included in the transmission request, i.e., using a communication method API corresponding to the cloud service included in the above-described transmission request (S193). For example, when the interface called "GetData (Destination Cloud, Cloud File)" is used as the communication method in S192, the communication mediator 45a of the communication mediation device 40 downloads a file designated in "Cloud File" in the cloud service designated in "Destination Cloud" using the communication method API for the cloud service designated in "Destination Cloud."

The communication mediator 45*a* transmits the file downloaded in S193 to the image processing device 30 via the communication device 43 (S194).

When the cloud service usage device 37*a* of the image processing device 30 receives the file transmitted in S194 via the communication device 35, the received file is printed by the printer 33 with the setting content received by the operation device 31 when the print setting screen is displayed (S195).

As described above, because the communication mediation device 40 causes the image processing device to log into the cloud service via the communication mediation device 40 itself, which is easier to update than the image processing device, without causing the image processing device to directly log into the cloud service (S137), it is possible to easily respond to vulnerabilities.

Because the communication mediation device 40 causes the image processing device to communicate with the cloud service via the communication mediation device itself, which is easier to update than the image processing device, without causing the image processing device to directly communicate with the cloud service (S164 and S193), it is possible to easily respond to vulnerabilities.

When an access token of each of a plurality of cloud services is associated with the user (S114) and the user logs into the communication mediator 45*a* via the image processing device with a PIN code that is information for linking the image processing device with the cloud service (S131) and when a plurality of cloud services and access tokens corresponding thereto are identified by the user who has logged into the communication mediator 45*a* via the image processing device, the communication mediation device 40 logs into all the cloud services associated with the access tokens at once (S137), it is possible to facilitate the work for inputting information for linking the image processing device with the cloud service to the image processing device.

Because the communication mediation device 40 executes communication between the communication mediator 45*a* and the image processing device in a unified method that does not depend on a type of cloud service, i.e., "SendData (ScanData, Destination Cloud, Cloud Directory)" and "GetData (Destination Cloud, Cloud File)" (S163 and S192), it is not necessary to change the image processing device for a change such as the addition of a corresponding cloud service or a change in a communication method of a corresponding cloud service and it is possible to cope with the change only by changing the communication mediation device 40.

The image processing system 20 employs a PIN code as information for a user to log into the communication mediator 45*a* of the communication mediation device 40 via the image processing device. However, it is also possible to employ information other than a PIN code as information for a user to log into the communication mediator 45*a* of the communication mediation device 40 via the image processing device. For example, the information for the user logging into the communication mediator 45*a* of the communication mediation device 40 via the image processing device may be a combination of a user ID and a password.

The communication between the image processing device and the communication mediation device 40 may be in an on-premises environment or may not be in an on-premises environment. The communication between the image processing device and the communication mediation device 40 is more secure when it is in an on-premises environment than when it is not in an on-premises environment.

Thus, in the present embodiment, the problem of insufficient response to vulnerabilities at the time of logging into the cloud service from the image processing device is solved. That is, according to the present embodiment, a security vulnerability can be easily avoided at the time of logging into the cloud service from the image processing device.

While the present disclosure has been described in detail with reference to the embodiments thereof, it would be apparent to those skilled in the art that the various changes and modifications may be made therein within the scope defined by the appended claims.

What is claimed is:

1. A communication mediation device comprising:
a controller that includes a processor and functions, through the processor executing a communication mediation program, as a communication mediator that mediates communication between an image processing device for executing image processing and a plurality of cloud services for storing data;
an operation device configured to receive an instruction from a user;
a communication device configured to communicate with the cloud services and the image processing device; and
a display device,
wherein the communication mediator:
causes the display device to display a list screen including a first button indicating a predetermined first process to be executed on a folder, a second button indicating a predetermined second process to be executed on a file, and a plurality of third buttons each indicating one of the cloud services, in a state in which operations on a first button and a second button are disabled;
causes, when the operation device receives a selection operation on any of the plurality of third buttons, the display device to display, on the list screen, folders and files included in a cloud service indicated by the selected third button;
enables an operation on the first button when the operation device receives an operation on a folder;
transmits, to the image processing device and the selected cloud service, a request for executing the first process when the operation device receives an operation on the first button;
enables an operation on the second button when the operation device receives an operation on a file; and
transmits, to the image processing device and the selected cloud service, a request for executing the second process when the operation device receives an operation on the second button.

2. The communication mediation device according to claim 1, wherein the communication mediator executes communication with the image processing device in a unified method that does not depend on a type of the cloud service.

3. The communication mediation device according to claim 1,
wherein the communication mediator accesses the cloud service with the communication device when a user identifier (ID) and a password for use in logging into the cloud service have been received by the operation device and logs into the cloud service using the user ID and the password,
wherein the communication mediator issues and registers a personal identification number (PIN) code for the cloud service when an access token has been received from the cloud service after the login and causes the display device to display the PIN code, and wherein the communication mediator logs into the cloud service using the access token through the communication device when the communication device has received the PIN code from the image processing device after the display of the PIN code on the display device.

4. A computer-readable non-transitory recording medium storing a communication mediation program for causing a computer provided in a communication mediation device having an operation device configured to receive an instruction from a user; a communication device configured to communicate with a plurality of cloud services and an image processing device; and a display device, to operate as a communication mediator for mediating communication between the image processing device and the cloud services, wherein the communication mediation program further causes the computer to operate so that the communication mediator:

causes the display device to display a list screen including a first button indicating a predetermined first process to be executed on a folder, a second button indicating a predetermined second process to be executed on a file, and a plurality of third buttons each indicating one of the cloud services, in a state in which operations on a first button and a second button are disabled;

causes, when the operation device receives a selection operation on any of the plurality of third buttons, the display device to display, on the list screen, folders and files included in a cloud service indicated by the selected third button;

enables an operation on the first button when the operation device receives an operation on a folder;

transmits, to the image processing device and the selected cloud service, a request for executing the first process when the operation device receives an operation on the first button;

enables an operation on the second button when the operation device receives an operation on a file; and transmits, to the image processing device and the selected cloud service, a request for executing the second process when the operation device receives an operation on the second button.

5. The computer-readable non-transitory recording medium storing the communication mediation program according to claim 4, wherein the communication mediation program further causes the computer to operate so that the communication mediator accesses the cloud service with the communication device provided in the communication mediation device when a user ID and a password for use in logging into the cloud service have been received by an operation device provided in the communication mediation device and logs into the cloud service using the user ID and the password, the communication mediator issues and registers a PIN code for the cloud service when an access token has been received from the cloud service by the communication device after the login and causes a display device provided in the communication mediation device to display the PIN code, and the communication mediator logs into the cloud service using the access token from the communication device when the communication device has received the PIN code from the image processing device after the display of the PIN code on the display device.

6. An image processing system comprising:

an image processing device configured to execute image processing; and a communication mediation device comprising:

a controller that includes a processor and functions, through the processor executing a communication mediation program, as a communication mediator that mediates communication between an image processing device for executing image processing and a plurality of cloud services for storing data;

an operation device configured to receive an instruction from a user;

a communication device configured to communicate with the cloud services and the image processing device; and a display device, wherein the communication mediator:

causes the display device to display a list screen including a first button indicating a predetermined first process to be executed on a folder, a second button indicating a predetermined second process to be executed on a file, and a plurality of third buttons each indicating one of the cloud services, in a state in which operations on a first button and a second button are disabled;

causes, when the operation device receives a selection operation on any of the plurality of third buttons, the display device to display, on the list screen, folders and files included in a cloud service indicated by the selected third button;

enables an operation on the first button when the operation device receives an operation on a folder;

transmits, to the image processing device and the selected cloud service, a request for executing the first process when the operation device receives an operation on the first button;

enables an operation on the second button when the operation device receives an operation on a file; and transmits, to the image processing device and the selected cloud service, a request for executing the second process when the operation device receives an operation on the second button.

* * * * *